(12) United States Patent
Nakajima et al.

(10) Patent No.: US 11,392,106 B2
(45) Date of Patent: Jul. 19, 2022

(54) SERVOMOTOR ADJUSTMENT DEVICE AND SERVOMOTOR ADJUSTMENT METHOD

(71) Applicant: OMRON Corporation, Kyoto (JP)

(72) Inventors: Kenji Nakajima, Hannan (JP); Mamoru Egi, Otsu (JP)

(73) Assignee: OMRON CORPORATION, Kyoto (JP)

( * ) Notice: Subject to any disclaimer, the term of this patent is extended or adjusted under 35 U.S.C. 154(b) by 245 days.

(21) Appl. No.: 16/643,857

(22) PCT Filed: Oct. 12, 2018

(86) PCT No.: PCT/JP2018/038195
§ 371 (c)(1),
(2) Date: Mar. 3, 2020

(87) PCT Pub. No.: WO2019/082704
PCT Pub. Date: May 2, 2019

(65) Prior Publication Data
US 2021/0026330 A1    Jan. 28, 2021

(30) Foreign Application Priority Data

Oct. 27, 2017   (JP) .............................. JP2017-208401

(51) Int. Cl.
*G06F 3/04847*       (2022.01)
*G05B 19/4155*       (2006.01)
*G06T 11/60*         (2006.01)

(52) U.S. Cl.
CPC ..... *G05B 19/4155* (2013.01); *G06F 3/04847* (2013.01); *G06T 11/60* (2013.01); *G05B 2219/42033* (2013.01); *G06T 2200/24* (2013.01)

(58) Field of Classification Search
CPC ...... G05B 19/4155; G05B 2219/42033; G06F 3/04847; G06T 11/60; G06T 2200/24
See application file for complete search history.

(56) References Cited

U.S. PATENT DOCUMENTS

| 5,475,291 A | 12/1995 | Yoshida et al. |
| 6,795,748 B2 | 9/2004 | Hammer et al. |

(Continued)

FOREIGN PATENT DOCUMENTS

| JP | H06-319284 A | 11/1994 |
| JP | 2006-004195 A | 1/2006 |

(Continued)

OTHER PUBLICATIONS

The extended European search report (EESR) dated Jul. 1, 2021 in a counterpart European patent application.

(Continued)

*Primary Examiner* — Haoshian Shih
(74) *Attorney, Agent, or Firm* — Metrolex IP Law Group, PLLC

(57) ABSTRACT

To improve the usability so that the result of adjustment of a plurality of axes operating in cooperation is easily evaluated. An adjustment apparatus displays a graph indicating a temporal change of measurement data for each control axis and a control instruction on the same time base in a first area in a screen, and displays a control trajectory of a control position of each control axis, the control instruction, and a target trajectory of a target position in the screen.

11 Claims, 10 Drawing Sheets

(56) References Cited

U.S. PATENT DOCUMENTS

| | | | |
|---|---|---|---|
| 2010/0226561 A1* | 9/2010 | Fujikawa | G06T 7/0004 |
| | | | 382/141 |
| 2011/0015877 A1 | 1/2011 | Okita et al. | |
| 2013/0050276 A1* | 2/2013 | Moriya | G05B 19/4069 |
| | | | 345/672 |
| 2013/0222391 A1 | 8/2013 | Tezuka et al. | |
| 2014/0180467 A1 | 6/2014 | Sato et al. | |
| 2015/0084572 A1* | 3/2015 | Tanaka | G05B 11/36 |
| | | | 318/568.1 |
| 2016/0239009 A1 | 8/2016 | Mizuno | |

FOREIGN PATENT DOCUMENTS

| | | |
|---|---|---|
| JP | 2008-102714 A | 5/2008 |
| JP | 2011-022688 A | 2/2011 |
| JP | 2011-192017 A | 9/2011 |
| WO | 2013/171875 A1 | 11/2013 |
| WO | 2015/068214 A1 | 5/2015 |

OTHER PUBLICATIONS

An English translation of the International Search Report("ISR") of PCT/JP2018/038195 dated Jan. 8, 2019.
An English translation of the Written Opinion("WO") of PCT/JP2018/038195 dated Jan. 8, 2019.

\* cited by examiner

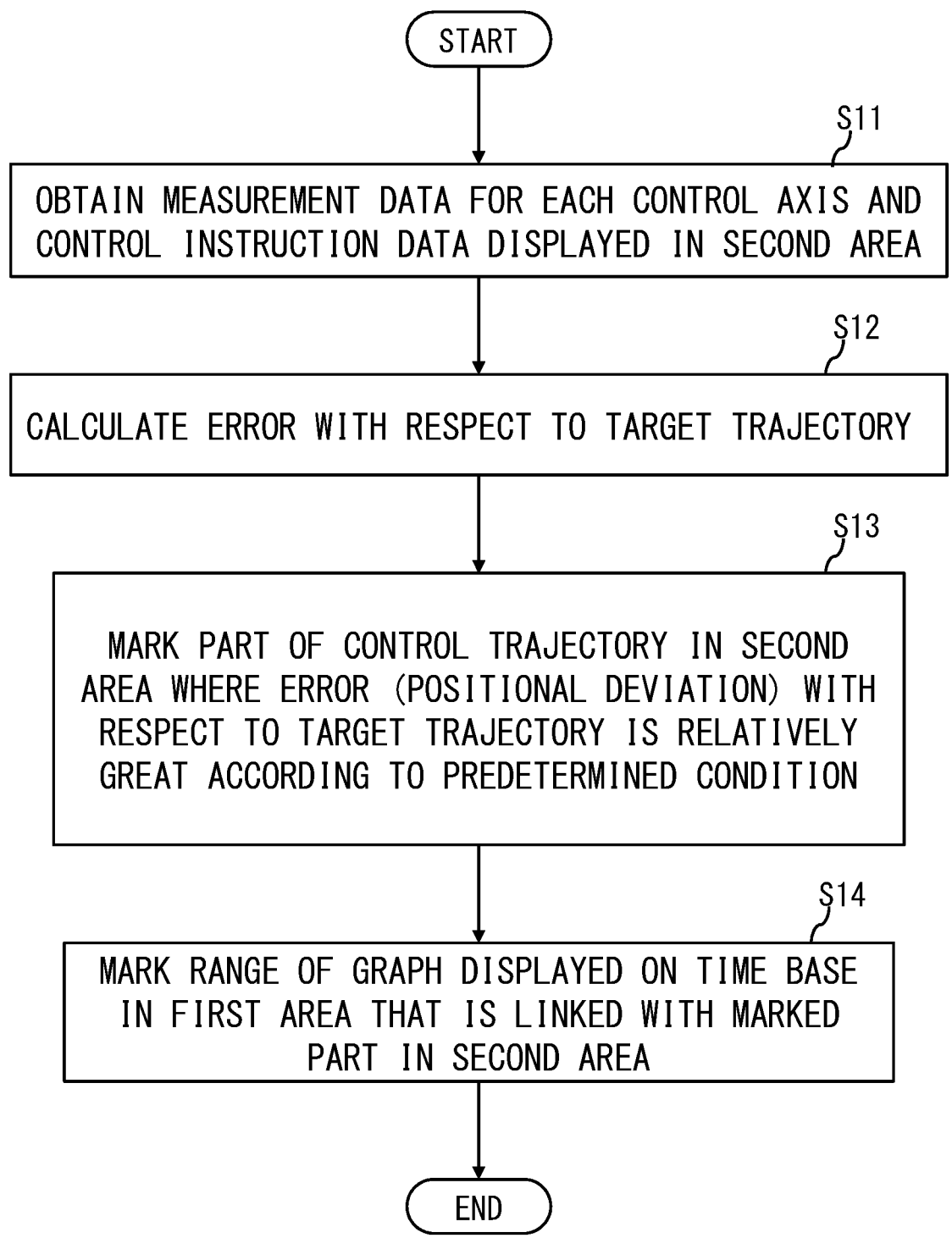

SERVOMOTOR ADJUSTMENT DEVICE AND SERVOMOTOR ADJUSTMENT METHOD

TECHNICAL FIELD

The present invention relates to a servomotor adjustment device and a servomotor adjustment method.

BACKGROUND ART

In the field of factory automation (FA) or robots, for example, a servo control system is known which controls motors that drive a control target by automatically controlling a control quantity, such as position, orientation or posture, of the control target so that the control quantity follows a target value. The servo control system controls a positioning table, a conveyor roller or a robot arm as a control target, and performs a multi-axis cooperation control or the like in which a plurality of motors are servo-controlled in association with each other.

In the servo control system, the servomotor adjustment device adjusts various parameters (servo parameters) for servo-controlling motors involved with the multi-axis cooperation control according to the type of the control target, the type of the control scheme, the characteristics of the motors driving the control target or the like. Servo parameters include various gain values, various filter characteristics or the like involved with the proportional-integral-differential (PID) control, for example. The various gain values include a speed proportional gain value, a speed integral gain value, and a position proportional gain value, for example. The various filter characteristics include torque filter characteristics that limit the output torque of a motor and notch filter characteristics that reduce mechanical resonance, for example.

Motors involved with the multi-axis cooperation control are servo-controlled according to the various parameters adjusted via the servomotor adjustment device, and speed data, position data or the like on the motors being driven under the servo control are measured at a predetermined sampling cycle, for example. The servomotor adjustment device obtains the measurement data described above, and displays the measurement data as a graph indicating a transition of the speed, position or the like on the time base on a display device such as a liquid crystal display (LCD). On the screen of the servomotor adjustment device, the speed change, position change or the like of each motor being driven involved with the multi-axis cooperation control is displayed in the form of a graph as time-series data.

A person (referred to also as a "user" hereinafter) who uses the servomotor adjustment device evaluates the response characteristics of each motor involved with the multi-axis cooperation control during operation under the servo control from the time-series change of each piece of measurement data displayed as a graph on the screen. In the adjustment operation for the servo control, adjustment of the setting condition for the various parameters based on the evaluation result of the response characteristics and evaluation of the measurement data based on the adjusted setting condition are repeated for each of the motors involved with the multi-axis cooperation control. Through the adjustment operation, the setting condition for the various parameters relating to the servo control is optimized for each of the motors that drive the control target under the multi-axis cooperation control.

As a prior art document in which a technique relating to the technique described in this specification is described, there is the following patent document.

CITATION LIST

Patent Document

[Patent document 1] Japanese Patent Laid-Open No. 2006-4195

SUMMARY OF THE INVENTION

Technical Problem

When evaluating the setting condition for the various parameters adjusted for each motor, the user of the servo control system that performs the multi-axis cooperation control makes the servo control system drive a control target by association of a plurality of motors under the setting condition, for example. The user makes the servomotor adjustment device obtain measurement data on each of the motors associated with each other and a control instruction (position instruction, motor speed instruction, torque instruction or the like) set as a target value and display the obtained information on the screen of the servomotor adjustment device as a graph.

From the time-series change of the measurement data for each motor and the transition of the target value on the same time base displayed as a graph on the screen of the servomotor adjustment device, the appropriateness of the condition for the various parameters set for each of the motor associated with each other in the multi-axis cooperation control is evaluated.

However, although the display of the transition of the information described above on the same time base displayed on the screen allows evaluation of the appropriateness of the condition for the various parameters for each motor, there is still a problem that it is difficult to evaluate the appropriateness of the state associated with each other in the multi-axis cooperation control.

The present invention has been devised in view of the problem described above, and an object of the present invention is to improve the usability so that the result of adjustment of a plurality of axes operating in cooperation is easily evaluated.

Solution to Problem

The present invention is illustrated by a servomotor adjustment device. Specifically, the servomotor adjustment device includes: first display means for displaying an adjustment screen for a servo parameter that is set for a motor driver that controls drive of a corresponding one of a plurality of control axes that make a control target operate in response to a control instruction; means for setting a condition for the servo parameter adjusted on the adjustment screen in the motor driver for each control axis; means for obtaining, along with the control instruction, measurement data on a speed control result or position control result for each of the control axes associated with each other under the condition for the servo parameter set in the motor driver for each control axis; and second display means for displaying a graph indicating a temporal change of the measurement data for each control axis and the control instruction on a same time base in a first area in the adjustment screen, and displaying, in a second area in the adjustment screen, a control trajectory that indicates a transition of a control position of a control axis by association of the measurement data on the control axes measured at a same time and a target trajectory that indicates a transition of a target position of the control axis by association of the control instructions for the control axes obtained at a same time.

With such a configuration, a transition of a plurality of associated control axes related with the time-series information can be displayed as the target trajectory and the control trajectory along with the time-series information for each control axis on the same time base displayed as a graph. From the visually recognized target trajectory and control trajectory, the followability of the parameter condition set with respect to the target trajectory or the mechanical characteristics, such as local vibrations, of the control target under the multi-axis cooperation control can be evaluated. As a result, the usability can be improved so that the result of adjustment of a plurality of axes operating in cooperation is easily evaluated.

In the present invention, the second display means may display the first area and the second area at the same time by superimposing the second area on a part of the first area where the second area does not interfere with visibility of at least the graph indicating a temporal change of the measurement data for each control axis and the control instruction on the same time base in the first area. With such a configuration, the temporal change of the measurement data for each control axis and the control instruction on the graph and the movement transition of the control trajectory following the target trajectory can be visually recognized at the same time. A cause of the error (positional deviation) of the control trajectory can be checked in keeping with the temporal change of the measurement data for each control axis.

In the present invention, the second display means may calculate an error of the control trajectory with respect to the target trajectory and display at least a part of the control trajectory displayed in the second area where the calculated error is relatively great in a discriminable manner.

With such a configuration, a part of the control trajectory displayed in the second area in which the error (positional deviation) of the control trajectory with respect to the target trajectory is relatively great can be specified with a marker or the like. The part of the control trajectory in which the error (positional deviation) with respect to the target trajectory is relatively great specified with a marker or the like can be easily identified. In addition, a part of the graph for each control axis displayed on the time base in the first area that corresponds to the marked part in the second area can be specified with a marker or the like. An error variation on the control trajectory can be checked in association with a data variation for each control axis on the time base displayed as a graph. As a result, a user interface can be provided which facilitates evaluation of the appropriateness of the condition for various parameters set and adjusted for each control axis.

In the present invention, the second display means may display a first manipulation element that specifies a transition period of the control trajectory and the target trajectory displayed in the second area by superimposing the first manipulation element on the time base displayed in the first area. With such a configuration, the time-series change of the measurement data for each control axis and the transition of the control target value in the specified time range can be extracted and displayed. The followability of the servomotors displayed on the same time base in the first area can be checked while referring to the target trajectory and control trajectory displayed in the second area.

In the present invention, the second display means may display reference axes perpendicular to each other in the second area, and display a second manipulation element for choosing whether to switch axis directions of the reference axes perpendicular to each other. With such a configuration, since the vertical axis and horizontal axis displayed in the second area can be easily switched, so that the convenience of the user is improved.

In the present invention, the second display means may display measurement data or a data value of the control instruction that corresponds to a position of a pointer displayed to be superimposed on the graph displayed in the first area. The second display means may also display a position data value that corresponds to a position of a pointer displayed to be superimposed on the control trajectory or target trajectory displayed in the second area. With such a configuration, a user interface can be provided which facilitates reading of various kinds of measurement data values displayed on the time base as a graph and data values of two-dimensional positions of the target trajectory and control trajectory.

In the present invention, the second display means may display one or more scale axes in the second area, and a unit scale on the scale axis may increase or decrease in a predetermined range in response to the second area being expanded or shrunk. With such a configuration, a user interface can be provided in which the error (positional deviation) between the target trajectory and the control trajectory is easily measured by referring to the scales.

In the present invention, the second display means may display an amount of a relative error between a first position specified on the control trajectory and a second position specified on the target trajectory displayed in the second area. With such a configuration, a user interface is provided in which the amount of the error (positional deviation) between the target trajectory and the control trajectory can be measured by specifying a start position and an end position.

The present invention may be a servomotor adjustment method, wherein a servomotor adjustment device performs: a first display step of displaying an adjustment screen for a servo parameter that is set for a motor driver that controls drive of a corresponding one of a plurality of control axes that make a control target operate in response to a control instruction; a step of setting a condition for the servo parameter adjusted on the adjustment screen in the motor driver for each control axis; a step of obtaining, along with the control instruction, measurement data on a speed control result or position control result for each of the control axes associated with each other under the condition for the servo parameter set in the motor driver for each control axis; and a second display step of displaying a graph indicating a temporal change of the measurement data for each control axis and the control instruction on a same time base in a first area in the adjustment screen, and displaying, in a second area in the adjustment screen, a control trajectory that indicates a transition of a control position of a control axis by association of the measurement data on the control axes measured at a same time and a target trajectory that indicates a transition of a target position of the control axis by association of the control instructions for the control axes measured at a same time.

The present invention can be identified as a servomotor adjustment device including at least part of the means or processings described above. The means or processings described above can be implemented in any combination as far as no technical contradiction occurs.

Advantageous Effects of the Invention

According to the present invention, the usability can be improved so that the result of adjustment of a plurality of axes operating in cooperation is easily evaluated.

BRIEF DESCRIPTION OF THE DRAWINGS

FIG. 10 is a flowchart illustrating an example of a user interface process according to the embodiment.

MODE FOR CARRYING OUT THE INVENTION

In the following, a servomotor adjustment device according to an embodiment will be described with reference to the drawings. The configuration of the embodiment described below is an illustrative one, and the servomotor adjustment device is not limited to the configuration of the embodiment.

<1. Servo Control System> (Summary of System)

Figure 1:
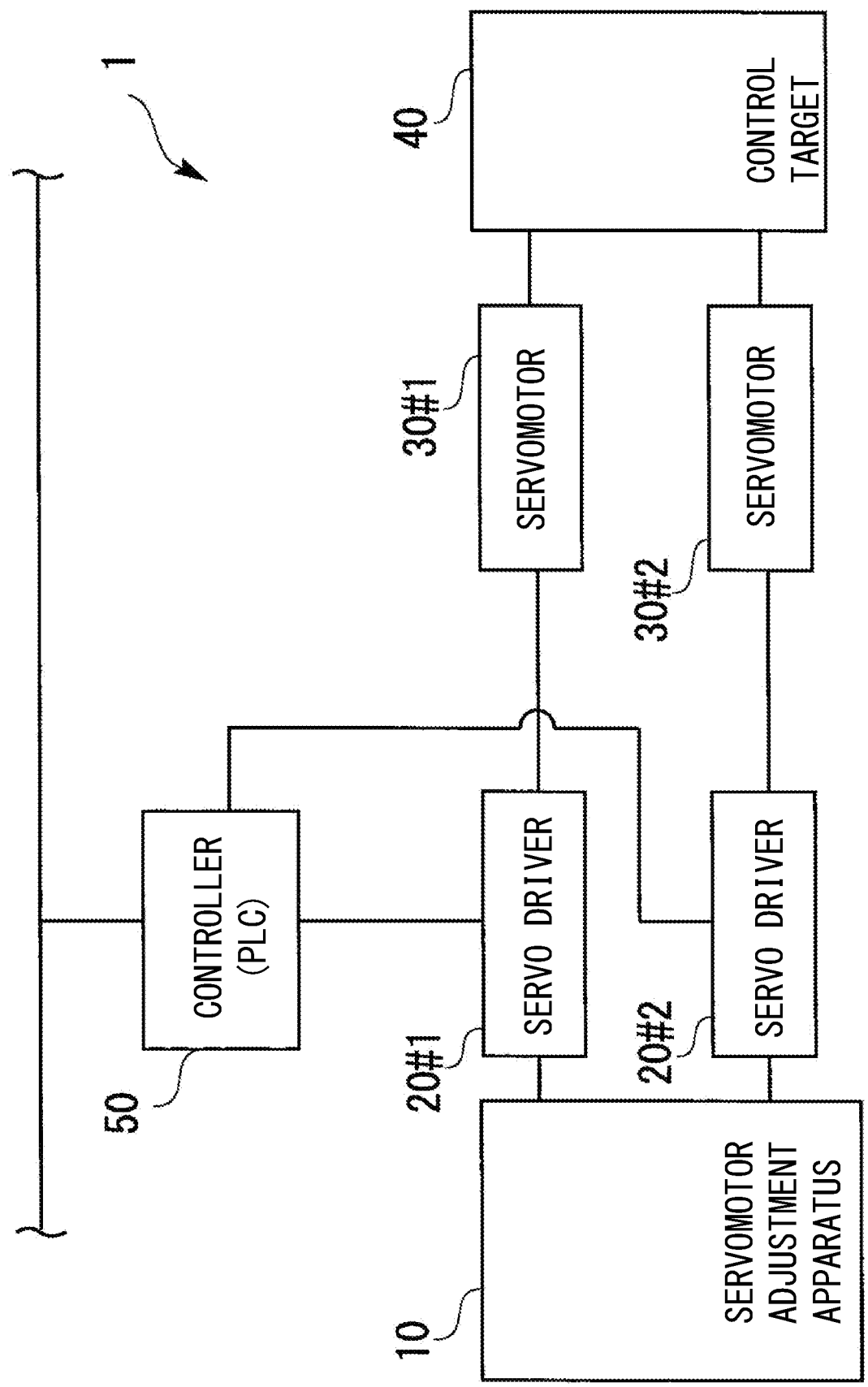
FIG. 1 is a diagram illustrating an example of a configuration of a servo control system according to an embodiment.

FIG. 1 is a diagram illustrating an example of a configuration of a servo control system 1 including a servomotor adjustment device 10 according to an embodiment as a component. The servo control system 1 illustrated in FIG. 1 is an example of a multi-axis cooperation control type, which involves a plurality of motors associated with each other to drive a control target. The servo control system 1 controls a positioning table, for example, and performs a positioning control in an XY plane by driving of a plurality of motors servo-controlled by a multi-axis cooperation control.

In the following, with regard to the multi-axis cooperation control type illustrated in FIG. 1, a processing functionality provided by the servomotor adjustment device (also referred to simply as an "adjustment apparatus" hereinafter) 10 according to this embodiment will be described. However, the application of the provided processing functionality is not limited to the positioning table. The control target may be a conveyor roller or a robot arm servo-controlled by the multi-axis cooperation control, and dimensions of operation of the control target may be a YZ plane, a ZX plane or a three-dimensional space. Control axes servo-controlled by the multi-axis cooperation control may be a motor group formed by a plurality of motors.

The servo control system 1 in FIG. 1 includes a servomotor adjustment device (also referred to simply as an "adjustment apparatus" hereinafter) 10, servo drivers 20 #1 and 20 #2, servomotors 30 #1 and 30 #2, a control target 40 driven by the servomotors 30 #1 and 30 #2, and a controller (programmable logic controller: PLC) 50. In the following description, the servo drivers 20 #1 and 20 #2 will also be collectively referred as a "servo driver 20". The same holds true for the servomotors 30 #1 and 30 #2.

The servomotor 30 #1 and the controller 50 are connected to the servo driver 20 #1, and the servomotor 30 #2 and the controller 50 are connected to the servo driver 20 #2. The servomotor 30 #1 functions as a control axis that controls driving of the control target 40 in an X-axis direction, for example, and the servomotor 30 #2 functions as a control axis that controls driving of the control target in a Y-axis direction. The servo driver 20 #1 and the controller 50 form a control system for the servomotor 30 #1 involved with the multi-axis cooperation control, and the servo driver 20 #2 and the controller 50 form a control system for the servomotor 30 #2 involved with the multi-axis cooperation control.

Each of the servomotors 30 #1 and 30 #2 includes a sensor (encoder) that detects the speed and the position during driving control. Various switches or various sensors that detect information used to trigger output of a control instruction to the servo driver 20 connected to the controller 50 are connected to the controller 50.

The adjustment apparatus 10 and the servo driver 20 in the servo control system 1 are connected by a wired or wireless communication network. The servo driver 20 and the controller 50 are connected via Ethernet (registered trademark) for Control Automation Technology (EtherCAT, registered trademark) in conformity with the Ethernet Standard IEEE802.3. The servo driver 20 and the servomotor 30 are communicatively connected by a dedicated cable, for example.

In the servo control system 1, the adjustment apparatus 10 adjusts various parameters (servo parameters) used for the servo control involved with the positioning control of the control target 40 in the XY plane to be appropriate to characteristics or the like of the servomotors 30 #1 and 30 #2. Response characteristics of the servomotors 30 #1 and 30 #2 associated with each other by the multi-axis cooperation control are adjusted so that the control target 40 is appropriately operated in the XY plane.

The various parameters adjusted are set in each servo driver 20. The servo driver 20 #1 automatically controls the servomotor 30 #1 based on the various parameters with the setting conditions adjusted and a control instruction (such as a position instruction, a motor speed, or a torque instruction) output from the controller 50. The servo driver 20 #2 automatically controls the servomotor 30 #2 based on the various parameters with the setting conditions adjusted and a control instruction (such as a position instruction, a motor speed, or a torque instruction) output from the controller 50. The control target 40 is cooperatively controlled by a power transmission mechanism for the servomotors 30 #1 and 30 #2 so that the position, orientation, posture or the like of the control target 40 follows a target value input as a control instruction from the controller 50 forming the control systems of the respective servomotors 30.

The servo driver 20 has a memory that retains the various parameters adjusted by the adjustment apparatus 10 or data detected by a sensor of the servomotor 30. Each servo driver 20 performs the servo control involved with the multi-axis cooperation control of the servomotor 30 connected to the servo driver 20 according to a servo parameter set in a predetermined storage area in the memory.

Measurement data, such as speed data or position data, detected by a sensor of each servomotor 30 is temporarily stored in a storage area different from the storage area described above in the servo driver 20 connected to the servomotor 30. For example, the servo driver 20 stores the speed of the servomotor 30 whose speed is controlled according to the servo parameter in the memory as measurement data detected at certain periodic intervals of 100 μs, for example. The adjustment apparatus 10 obtains the measurement data stored in the memory of each servo driver 20 over a communication network.

The control instruction input from the controller 50 can be read by the adjustment apparatus 10 in response to a predetermined command. When the predetermined command is input to the servo driver 20 from the adjustment apparatus 10, for example, the servo driver 20 associates the control instruction input from the controller 50 with the measurement data obtained for the servomotor 30 with each other to output to the adjustment apparatus 10.

(Configuration of Adjustment Apparatus)

Figure 2:
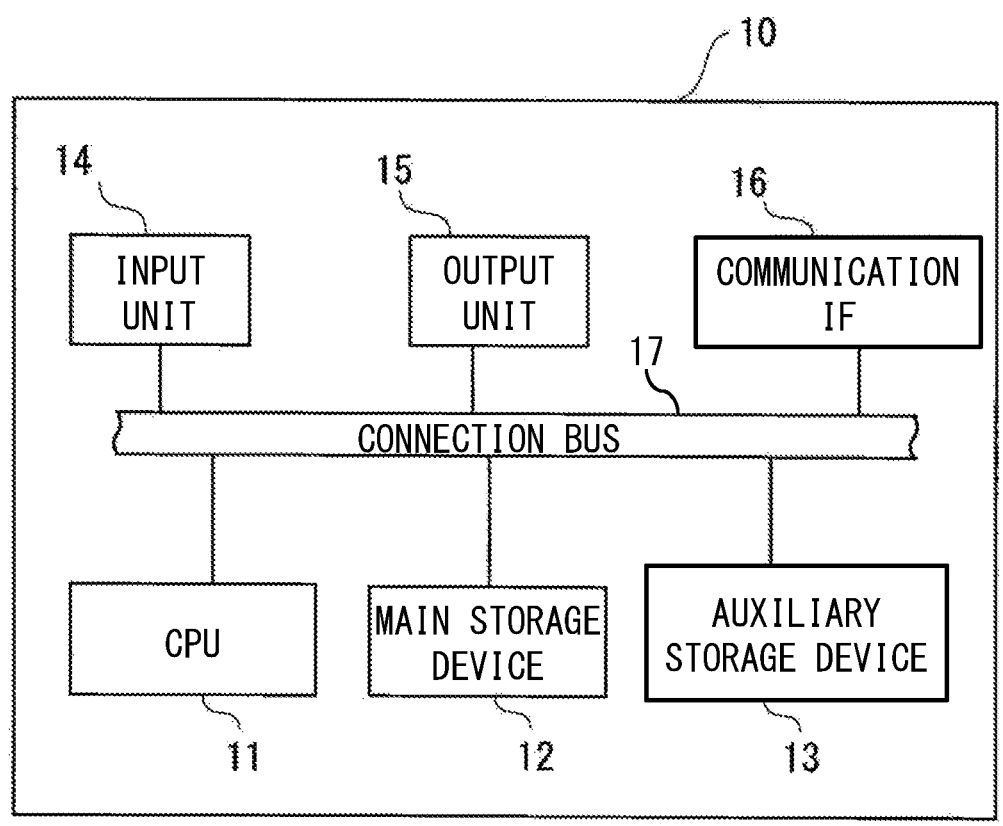
FIG. 2 is a diagram illustrating an example of a hardware configuration of a servomotor adjustment device.

FIG. 2 is a diagram illustrating an example of a hardware configuration of the adjustment apparatus 10 according to this embodiment. As illustrated in FIG. 2, the adjustment apparatus 10 is configured as a computer including a central processing unit (CPU) 11, a main storage device 12, an auxiliary storage device 13, an input unit 14, an output unit 15 and a communication IF 16. The main storage device 12 and the auxiliary storage device 13 are recording media that can be read by the adjustment apparatus 10. The adjustment apparatus 10 provides a functionality that meets a predetermined objective by the CPU 11 deploying a program stored in the auxiliary storage device 13 in a working area of the main storage device 12 in an executable manner and executing the program to control peripheral equipment. A plurality of each of the components described above may be provided, or some of the components may be omitted.

The CPU 11 is a central processing arithmetic device that controls the entire adjustment apparatus 10. The CPU 11 is also referred as a microprocessor (MPU) or a processor. However, the CPU 11 is not limited to a single processor but may have a multi-processor configuration. Alternatively, a single CPU 11 connected by a single socket may have a multi-core configuration. The CPU 11 performs a processing according to a program stored in the auxiliary storage device 13.

The main storage device 12 is a storage medium used by the CPU 11 to cache a program or data or as a working area. The main storage device 12 may be a flash memory, a random access memory (RAM), or a read only memory (ROM), for example. The auxiliary storage device 13 is a storage medium that stores a program (including an operating system (OS)) executed by the CPU 11 or setting information on an operation. The OS includes a communication interface program for transmission and reception of data to and from equipment connected to the adjustment apparatus 10 via the communication IF 16, for example. The auxiliary storage device 13 may be a hard-disk drive (HDD), a solid state drive (SSD), an erasable programmable ROM (EPROM), a flash memory, a USB memory, or a secure digital (SD) memory card, for example.

The input unit 14 receives an operation instruction or the like from an operator. For example, the input unit 14 is an input device, such as a keyboard, a touch panel, or a pointing device such as a mouse. The output unit 15 outputs data or information processed by the CPU 11 or data or information stored in the main storage device 12 or auxiliary storage device 13. The output unit 15 may be an output device, such as a display device such as a liquid crystal display (LCD), an electroluminescence (EL) panel or an organic EL panel, or a printer. The communication IF 16 is an interface to a communication network or the like connected to the adjustment apparatus 10.

At least some of processings performed by the adjustment apparatus 10 may be provided by a digital signal processor (DSP), an application specific integrated circuit (ASIC) or the like. Alternatively, at least some of the processings may be provided by a dedicated large scale integration (LSI) such as a field-programmable gate array (FPGA), a numerical processor, a vector processor or an image processor, or other digital circuits. Alternatively, at least some of the processings may involve an analog circuit. The adjustment apparatus 10 includes the auxiliary storage device 13 as a storage referred to or used to store data being managed by the CPU 11 or the like when performing the processings described above.

(Summary of Function of Adjustment Apparatus)

When the adjustment apparatus 10 adjusts the various parameters for the multi-axis cooperation control involved with the operation of the control target 40, a program for adjusting the various parameters is activated through user operation. In response to the activation of the program, a parameter adjustment screen is displayed on a display device, such as an LCD, of the adjustment apparatus 10.

A user of the adjustment apparatus 10 performs adjustment on the parameter adjustment screen (also referred to simply as an "adjustment screen" hereinafter) to make various gain (such as speed proportional gain, speed integral gain or position proportional gain) values involved with a PID control in the multi-axis cooperation control appropriate to the response characteristics of the motors associated with each other involved with the servo control. Similarly, filter characteristics (characteristics of a torque filter that limits the output torque of each motor or characteristics of a notch filter that suppresses a mechanical resonance) or the like involved with the PID control in the multi-axis cooperation control are adjusted to be appropriate to the response characteristics of the motors associated with each other involved with the servo control. A condition for the various parameters adjusted is set in the servo drivers 20 associated with the respective servomotors 30 forming each of the control axes of the control target 40.

Evaluation of the condition for the various parameters adjusted is performed based on the measurement data (such as speed data or position data) obtained from each servomotor 30 being driven under the condition and a control instruction or the like. The adjustment apparatus 10 obtains the measurement data from the servomotors 30 being driven involved with the multi-axis cooperation control and the control instruction or the like via the respective servo drivers 20.

The adjustment apparatus 10 displays the measurement data from the servomotor 30 being driven and the control instruction or the like in a predetermined display area on the adjustment screen in the form of a graph that indicates a change of speed or the like and a transition of a control target value on a same time base. In the display area, for example, time-series data that indicates a change of speed or position of each servomotor 30 forming a control axis of the control target 40 or a transition of a control target value is displayed as a graph color-coded on each control axis in a superimposed manner.

In adjustment of the servo control system 1, the user evaluates the response characteristics of each motor involved with the adjustment in the multi-axis cooperation control from the time-series change of each piece of measurement data and the transition of the control target value associated with the servomotor 30 being driven displayed as a graph on the same time base. Through the time-series change of the measurement data for each control axis and the transition of the control target value displayed as a graph on the same time base, the setting condition for the various parameters for each motor being driven in association in the multi-axis cooperation control is evaluated.

When the time-series change of the measurement data for each control axis and the transition of the control target value are displayed as a graph, the adjustment apparatus 10 according to this embodiment provides a display area for displaying a transition (trajectory) on a two-dimensional plane (XY plane, YZ plane or ZX plane, for example) drawn based on the above-described information on each control axis. On the adjustment screen, the adjustment apparatus 10 according to this embodiment displays the display area for displaying the transition on the two-dimensional plane (also referred to as a "2D display area" hereinafter) alongside of the display area in which the time-series change of the measurement data for each control axis and the transition of the control target value are displayed as a graph on the same time base.

In the 2D display area, for example, a trajectory based on the transition of the control target value obtained from each control axis is displayed as a target trajectory. In addition, in the 2D display area, a trajectory based on the time-series change of the measurement data obtained from each control axis is displayed as a control trajectory (actual trajectory).

The adjustment apparatus 10 according to this embodiment displays the graph of the time-series information (measurement data, control target value) for each control axis on the same time base alongside of the information on the control state (target trajectory, control trajectory) of the motors associated with each other. The adjustment apparatus 10 according to this embodiment can present, at the same time on the adjustment screen, the graph of the time-series information for each control axis on the same time base and the information indicating the control state of the associated motors.

Therefore, the user can grasp the graph of the time-series information for each control axis on the same time base and the information indicating the control state of the associated motors, which are displayed side by side on the adjustment screen, at the same time. For example, the user can visually recognize the positional deviation with respect to the target trajectory of the control positions of the servomotors 30 associated in the multi-axis cooperation control from the target trajectory and control trajectory displayed in the 2D display area. From the visually recognized positional deviation, the followability of the parameter condition set with respect to the target trajectory or the mechanical characteristics (local vibrations) of the control target 40 under the multi-axis cooperation control can be evaluated.

The adjustment apparatus 10 according to this embodiment can provide a user interface that allows easy evaluation of the result of adjustment of a plurality of axes operating in cooperation. Therefore, the adjustment apparatus 10 can improve the usability in the adjustment of the servomotors.

<2. Example of Processing> (Case 1)

Figure 3:
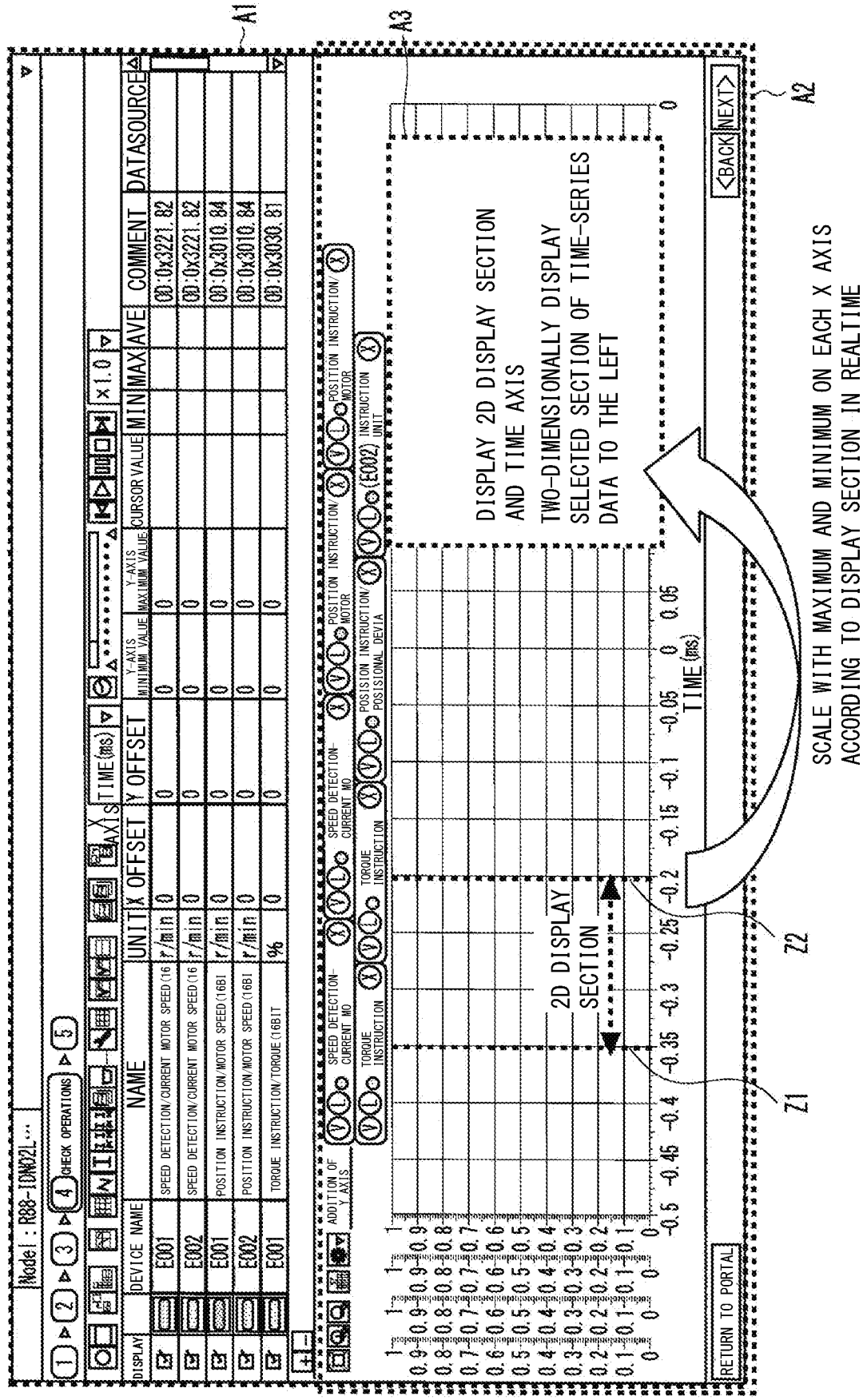
FIG. 3 is a diagram illustrating an example of a parameter adjustment screen according to the embodiment.

In the following, with reference to FIGS. 3 to 8, the user interface provided by the adjustment apparatus 10 according to this embodiment will be described. FIG. 3 illustrates an example of the parameter adjustment screen according to this embodiment. The adjustment screen illustrated in FIG. 3 is displayed on the display device when the setting condition for various parameters adjusted for each motor of the servo control system 1 that performs the multi-axis cooperation control is evaluated.

In FIG. 3, in an area A2 in a display area A1 in which the adjustment screen is displayed, for example, time-series information (measurement data, control target value) on the same time base on each of the control axes associated with each other in a state where various parameters adjusted for each motor were set is displayed as a graph, for example. The graph of the time-series information is displayed with the normalized magnitude of each type of information indicated on the vertical axis and the elapsed time corresponding to a predetermined sampling cycle indicated on the horizontal axis. The graph of the time-series information displayed in the area A2 is displayed on the same time base with each type of information color-coded with a different color, for example.

In the display area A1 in which the adjustment screen is displayed, the adjustment apparatus 10 further displays an area A3, in which information (target trajectory, control trajectory) on the control state of the motors associated with each other in a state where the various parameters adjusted for each motor were set, for example. FIG. 3 illustrates an example of an implementation in which the area A3 displayed has a rectangular shape. The area A3 may have a circular or elliptical shape, for example.

The area A3 can be displayed in the display area A1 in response to an operation of pressing a graphical user interface (GUI) element for displaying the area A3 provided on the adjustment screen, or a command operation, for example. The adjustment apparatus 10 can also display the area A3 along with the area A2 in response to an operation of displaying the adjustment screen in FIG. 3 on the display device.

The adjustment apparatus 10 can display the area A3 and the area A2 at the same time by superimposing the area A3 in a region of the area A2 where the area A3 does not interfere with the visibility of the time-series information on the same time base on each control axis displayed as a graph in the area A2, for example. However, the position of the area A3 displayed in the display area A1 may be fixed in advance. The area A3 can be displayed at any position as far as the time-series information on the same time base on each control axis displayed as a graph in the area A2 can be visually recognized at the same time.

The information on the control state of the associated motors displayed in the area A3 is a trajectory (target trajectory, control trajectory) on a two-dimensional plane (XY plane, YZ plane, ZX plane, for example) drawn based on a time-series change of measurement data for each control axis or a transition of a control target value. However, when the control target 40 is operated in a three-dimensional space, the information may be a combination of the trajectories in the XY plane, YZ plane and ZX plane or a trajectory (target trajectory, control trajectory) in a three-dimensional space drawn based on a time-series change of measurement data for each control axis and a transition of a control target value. Depending on the number of dimensions of the operation of the control target 40, the way of displaying the information on the control state of the motors associated in the multi-axis cooperation control can be determined.

(Case 2)

The adjustment apparatus 10 can also specify a range on the time base for the above information displayed in the area A3. As illustrated in FIG. 3, the adjustment apparatus 10 can display a pair of measuring cursors (Z1, Z2) perpendicular to the time base in the area A2 as the GUI element for specifying a range on the time base for the above information displayed in the area A3.

The adjustment apparatus 10 can receive an expansion or shrinkage movement on the time base for the pair of measuring cursors (Z1, Z2) through a drag operation or the like and obtain the time range (indicated as a "2D display section" in FIG. 3) specified by the pair of measuring cursors (Z1, Z2) as the range on the time base for the information displayed in the area A3. The adjustment apparatus 10 displays, in the area A3, the target trajectory and control trajectory in the two-dimensional plane drawn based on the time-series change of the measurement data for each control axis that corresponds to the time range specified by the pair of measuring cursors (Z1, Z2) and the transition of the control target value.

The adjustment apparatus 10 can extract the time-series change of the measurement data for each control axis and the transition of the control target value in the time range specified by the pair of measuring cursors (Z1, Z2) to be capable of being displayed in the area A3. The user can check the followability of each servomotor 30 by referring to the target trajectory and control trajectory in the two-dimensional plane in the time range linked with the area A3.

The position where the measuring cursors (Z1, Z2) are initially displayed can be the left end of the graph display frame displayed in the area A2, for example. The initial section width between the measuring cursors can be automatically set according to the sampling rate of the measurement data, for example.

The adjustment apparatus 10 can also expand or shrink the time range displayed in the area A3 in association with the time range specified by the pair of measuring cursors (Z1, Z2) being operated. This allows the variability of each control axis displayed in the area A2 to be relatively compared with the change of the target trajectory and control trajectory on the two-dimensional plane displayed to be associated with the area A3. The adjustment apparatus 10 can provide a user interface that helps the user to understand what is occurring on the plurality of motors (control axes) associated with each other in the multi-axis cooperation control.

(Case 3)

The adjustment apparatus 10 can also automatically scale the display range of the target trajectory and control trajectory on the two-dimensional plane displayed in the area A3 with a maximum value and a minimum value of each control axis. The scaling allows the relative behavior of the control axes associated with each other in the multi-axis cooperation control to be more easily checked. The adjustment apparatus 10 can provide a user interface that allows the relative behavior between the plurality of motors (control axes) associated with each other in the multi-axis cooperation control to be easily checked.

(Case 4)

In the adjustment in the multi-axis cooperation control, the user may check the control trajectory with respect to the target trajectory by switching scale axes (vertical axis, horizontal axis) of the target trajectory and control trajectory on the two-dimensional plane displayed in the area A3. This is intended to comprehensively evaluate the allowable range of the control trajectory from the target trajectory. The adjustment apparatus 10 can also display scale axes indicating a two-dimensional plane when displaying the area A3, and allow the user to choose whether to switch the axis directions of the displayed scale axes.

Figure 4:
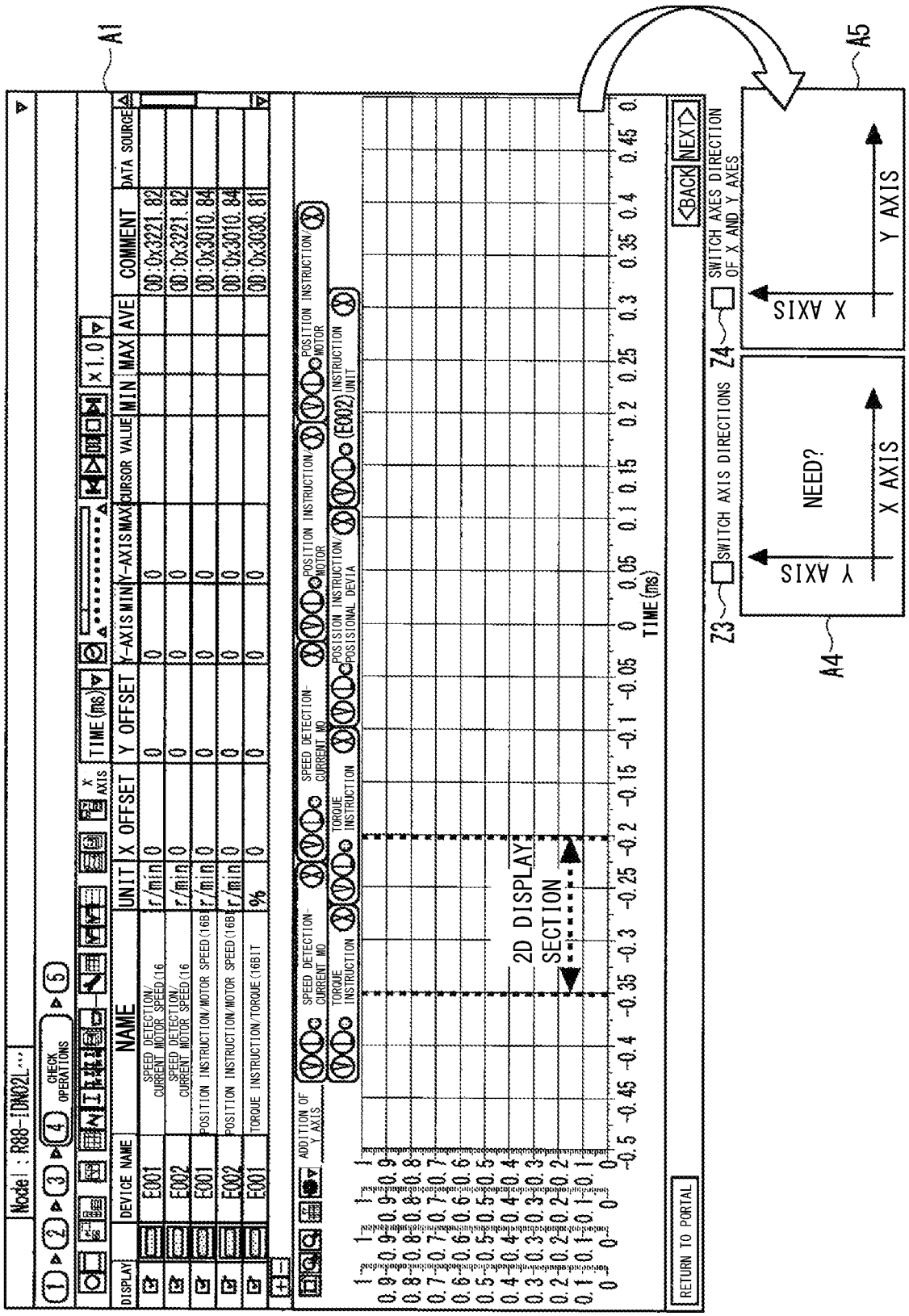
FIG. 4 is a diagram illustrating a user interface that allows switching of axis directions.

FIG. 4 is a diagram illustrating a user interface that allows switching of axis directions on the two-dimensional plane displayed in the area A3. FIG. 4 illustrates an example of an implementation in which a radio button for choosing whether to switch axis directions on the two-dimensional plane is provided in the area A3. In the area A3, the target trajectory and the control trajectory on the two-dimensional plane drawn based on the time-series change of the measurement data for each control axis and the transition of the control target value are displayed along with the radio button.

In FIG. 4, the display area A1 is a display area in the adjustment screen that is displayed on the display device of the adjustment apparatus 10. As illustrated above with reference to FIG. 3, the display area A1 includes the area A2 in which the graph of the time-series information on the same time base on each of the control axes associated with each other in a state where the various parameters adjusted for each motor were set is displayed.

The adjustment apparatus 10 can also display a radio button Z3 in combination with the graph in the display mode illustrated in an area A4, when displaying the target trajectory and control trajectory on the two-dimensional plane in the area A3, for example. The display mode in the area A4 is an exemplary mode in which the X-axis and Y-axis of the two-dimensional plane are the horizontal axis and vertical axis, respectively, for example. A comment that indicates a specific operation, such as "switch axis directions", is added to the radio button Z3. The area A4 and the radio button Z3 illustrated in FIG. 4 can be displayed with a template previously stored in the auxiliary storage device 13 or the like, for example.

When displaying the graph in the display mode in A4, the adjustment apparatus 10 can also display a comment, such as a notification display "need?", that confirms the need to display axes in a color (such as red) different from the color (such as black) of each axis. The adjustment apparatus 10 can determine that the answer to the displayed comment is "YES" if the key "Y" is pressed on the keyboard and that the answer is "NO" if the key "N" is pressed, for example.

For example, the adjustment apparatus 10 receives a click operation performed with a cursor or the like placed over the display area of the radio button Z3, and then switches the vertical axis and horizontal axis in the two-dimensional plane displayed in the area A4 to the X-axis and Y-axis, respectively. If the switching of the axis directions occurs, for example, a combination of the graph in the display mode illustrated in an area A5, in which the X-axis is the vertical axis and the Y-axis is the horizontal axis, and a radio button Z4 is displayed in the area A3. A comment that indicates a specific operation, such as "switch X and Y axes", is added to the radio button Z4, for example.

For example, the adjustment apparatus 10 receives a click operation performed with a cursor or the like placed over the display area of the radio button Z4, and then switches the vertical axis and horizontal axis in the two-dimensional plane displayed in the area A5 to the Y-axis and X-axis, respectively.

Since the adjustment apparatus 10 has the user interface illustrated in FIG. 4, the adjustment apparatus 10 can switch the axis directions on the two-dimensional plane displayed in the area A3. The adjustment apparatus 10 can easily switch the vertical and horizontal axes in response to a user operation on the radio button Z3 or Z4 and therefore is improved in usability.

(Case 5)

The adjustment apparatus 10 can mark a part where the error (positional deviation) of the control trajectory with respect to the target trajectory is relatively great when displaying the target trajectory and control trajectory on the two-dimensional plane drawn based on the time-series change of the measurement data for each control axis and the transition of the control target value. Through this marking, the adjustment apparatus 10 can provide a user interface in which the appropriateness of the correlated motions of the motors associated with each other in the multi-axis cooperation control can be determined based on the amount of the error (positional deviation) of the control trajectory with respect to the target trajectory. The adjustment apparatus 10 can provide a user interface in which the correlated motions of the associated motors displayed as a graph, which have been difficult to evaluate depending on the time-series information on the same time base on each control axis, can be easily evaluated.

Figure 5:
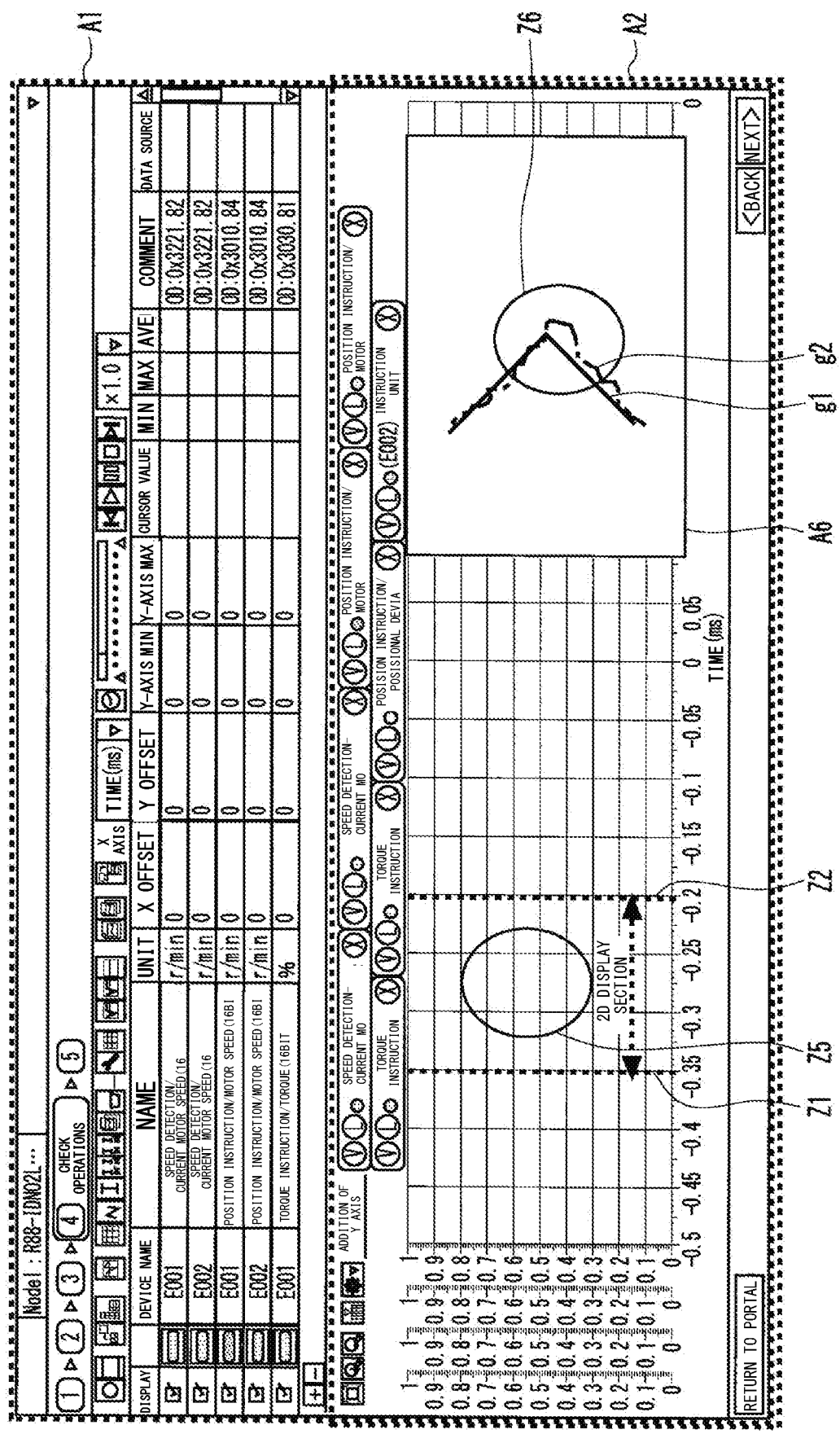
FIG. 5 is a diagram illustrating a user interface involved with display of a marker.

FIG. 5 is a diagram illustrating the user interface in Case 5. FIG. 5 illustrates an example of an implementation in which a part where the error (positional deviation) of the control trajectory with respect to the target trajectory is relatively great is marked with a circle. An area A6 in FIG. 5 corresponds to the area A3 in FIG. 3 in which the target trajectory and the control trajectory are marked.

In FIG. 5, the display area A1 is a display area in the adjustment screen displayed on the display device of the adjustment apparatus 10, as in FIG. 3 and other drawings. As illustrated above with reference to FIG. 3, the display area A1 includes the area A2 in which the graph of the time-series information on the same time base on each of the control axes associated with each other in a state where the various parameters adjusted for each motor were set is displayed. Furthermore, in the display area A1, the area A6 is displayed at the same time in a superimposed manner in a region where the area A6 does not interfere with the visibility of the time-series information on the same time base on each control axis displayed as a graph in the area A2.

In the area A6, a target trajectory g1 and a control trajectory g2 on a two-dimensional plane drawn based on the time-series change of the measurement data for each control axis and the transition of the control target value are displayed. In the area A6, the target trajectory g1 and the control trajectory g2 are displayed in a discriminable manner. For example, the color of the target trajectory g1 and the color of the control trajectory g2 may be different.

The range on the time base of the measurement data for each control axis and the control target value displayed as the target trajectory g1 and the control trajectory g2 in the area A6 is the range (2D display section) specified by the pair of measuring cursors (Z1, Z2).

As illustrated in the area A6 in FIG. 5, a part where the error (positional deviation) of the control trajectory with respect to the target trajectory is relatively great is marked by circling with a circular marker Z6. The control trajectory varies with respect to the target trajectory within a predetermined allowable range, and the circling with the circular marker Z6 allows identification of the display range for a part of the control trajectory displayed in the area A6 in which the amount of the error (positional deviation) with respect to the target trajectory is relatively great.

However, the manner of circling is not limited to using the circular marker Z6. The marker Z6 may have a rectangular or polygonal shape, and a predetermined range of the part where the error with respect to the target trajectory is relatively great may be highlighted or identified by a color different from the background color. The marking can be achieved in any manner as far as the part of the control trajectory displayed in the area A6 in which the amount of the error (positional deviation) with respect to the target trajectory is relatively great can be distinguished.

The size of the marker Z6 displayed in the area A6 can be increased or decreased within a range defined by preset upper and lower limit values according to the range specified by the pair of measuring cursors (Z1, Z2), for example. The visibility of the part of the control trajectory specified by the marker Z6 can be improved by increasing or decreasing the size of the marker Z6 according to the range specified by the pair of measuring cursors (Z1, Z2).

The adjustment apparatus 10 may mark a data period displayed as a graph in the area A2 that corresponds to the target trajectory and control trajectory specified by the marker Z6. As illustrated in the area A2 in FIG. 5, a period of the measurement data displayed as a graph that corresponds to the marker Z6 can be marked with a circular marker Z5. For example, the adjustment apparatus 10 can identify the period on the time base that corresponds to the control trajectory in the range specified by the marker Z6, and display the marker Z5 superimposed on the part of the displayed graph in the identified period. The marker Z5 is displayed to be superimposed at least on the part of the displayed graph in the range specified by the pair of measuring cursors (Z1, Z2).

The adjustment apparatus 10 may mark a plurality of parts depending on the length of the period in the range (2D display section) specified by the pair of measuring cursors (Z1, Z2). For example, the number of parts to be marked may be previously determined on the basis of a predetermined period. For example, a predetermined number of parts of the control trajectory selected in descending order of the magnitude of the error (positional deviation) with respect to the target trajectory may be displayed. Alternatively, a threshold for marking may be previously set for the error (positional deviation) with respect to the target trajectory. The adjustment apparatus 10 can extract a plurality of parts having greater errors of the control trajectories of the motors associated with each other in the multi-axis cooperation control and present the extracted parts.

Figure 6:
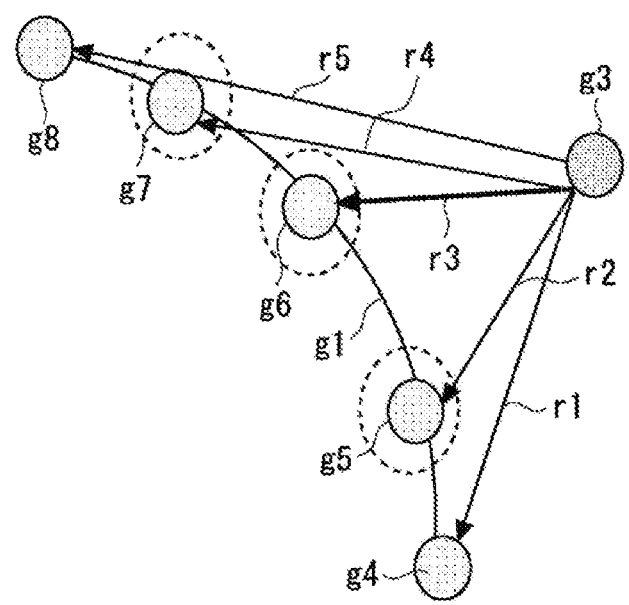
FIG. 6 is a diagram illustrating determination of an amount of error with respect to a target trajectory.

FIG. 6 is a diagram illustrating the determination of the amount of the error with respect to the target trajectory. In FIG. 6, the adjustment apparatus 10 approximately expresses the target trajectory g1 as a quadratic function, and determines distances (positional deviations r1 to r5) between the approximate quadratic function and a control position g3 as errors.

For example, the adjustment apparatus 10 determines the control position g3 from the measurement data, and calculates distances between the control position g3 and relative target positions (g4, g5, g6, g7, and g8) on the target trajectory g1 approximately expressed as a quadratic function. The control position g3 is measurement data (position data) obtained for each control axis. The relative target positions on the target trajectory g1 may be a position specified by a control instruction (position instruction) for each control axis at the time when the measurement data was obtained and positions specified by the control instructions preceding and following the control instruction (by two points) on the time base.

The adjustment apparatus 10 compares the calculated distance values and determines a target position that corresponds to the minimum distance value (shortest distance). After determining the target position at which the distance value from the control position g3 is the minimum, the adjustment apparatus 10 further determines target positions preceding and following the target position on the target trajectory g1. For example, in FIG. 6, the distance values (r1 to r5) between the control position g3 and the target positions (g4, g5, g6, g7 and g8) on the target trajectory g1 are compared, and the target position g6 corresponding to the shortest distance r3 is determined. In addition, the target positions g5 and g6 preceding and following the target position g6 are determined. In FIG. 6, the target positions g5, g6 and g7 on the target trajectory g1 each circled by a dashed line are extracted for determination of the error.

The adjustment apparatus 10 estimates values of coefficients of the approximate quadratic function from the extracted three points (target positions g5, g6 and g7). Provided that the approximate quadratic function of the target trajectory g1 is expressed as [$y=ax^2+bx+c$], the coefficient values (a, b, c) are estimated from the extracted three points (target positions g5, g6 and g7).

For example, the adjustment apparatus 10 assumes the two-dimensional coordinates of the control position g3 as (X0, Y0) and assumes coordinates on the quadratic function for which the error is to be calculated as (P, y(P)). Then, the adjustment apparatus 10 calculates the distance between the two-dimensional coordinates (X0, Y0) and the coordinates (P, y(P)) on the quadratic function. The x coordinate P on the quadratic function is calculated according to the following formula.

$$dL/dP=[(P-X0)^2+(y(P)-Y0)^2]=0$$

When the control target 40 operating in a three-dimensional space is driven by the control axes (servomotors) involved with the multi-axis cooperation control, the x coordinate is algebraically calculated according to the Cardano's formula.

The adjustment apparatus 10 calculates an error (positional deviation) L with respect to the target trajectory from the calculated x coordinate P. The error L is calculated according to the following formula.

$$\text{Error } L=\{(P-X0)^2+(y(P)-Y0)^2\}$$

Referring to FIG. 5 again, the marker Z6 in the area A6 is displayed for the part where the error L calculated based on the measurement data for each control axis in the range (2D display section) specified by the pair of measuring cursors (Z1, Z2) is relatively at the maximum, for example.

(Case 6)

In FIG. 5, if a cursor or the like is placed over the various graphs on the time base displayed in the area A2 or over the target trajectory g1 or control trajectory g2 displayed on the two-dimensional plane in the area A6, the adjustment apparatus 10 can display a data value corresponding to the position indicated by the cursor. The adjustment apparatus 10 can provide a user interface that allows easy reading of the various kinds of measurement data on the time base displayed as a graph in the area A2 or the data value of the target trajectory g1 or control trajectory g2 displayed on the two-dimensional plane in the area A6.

Figure 7:
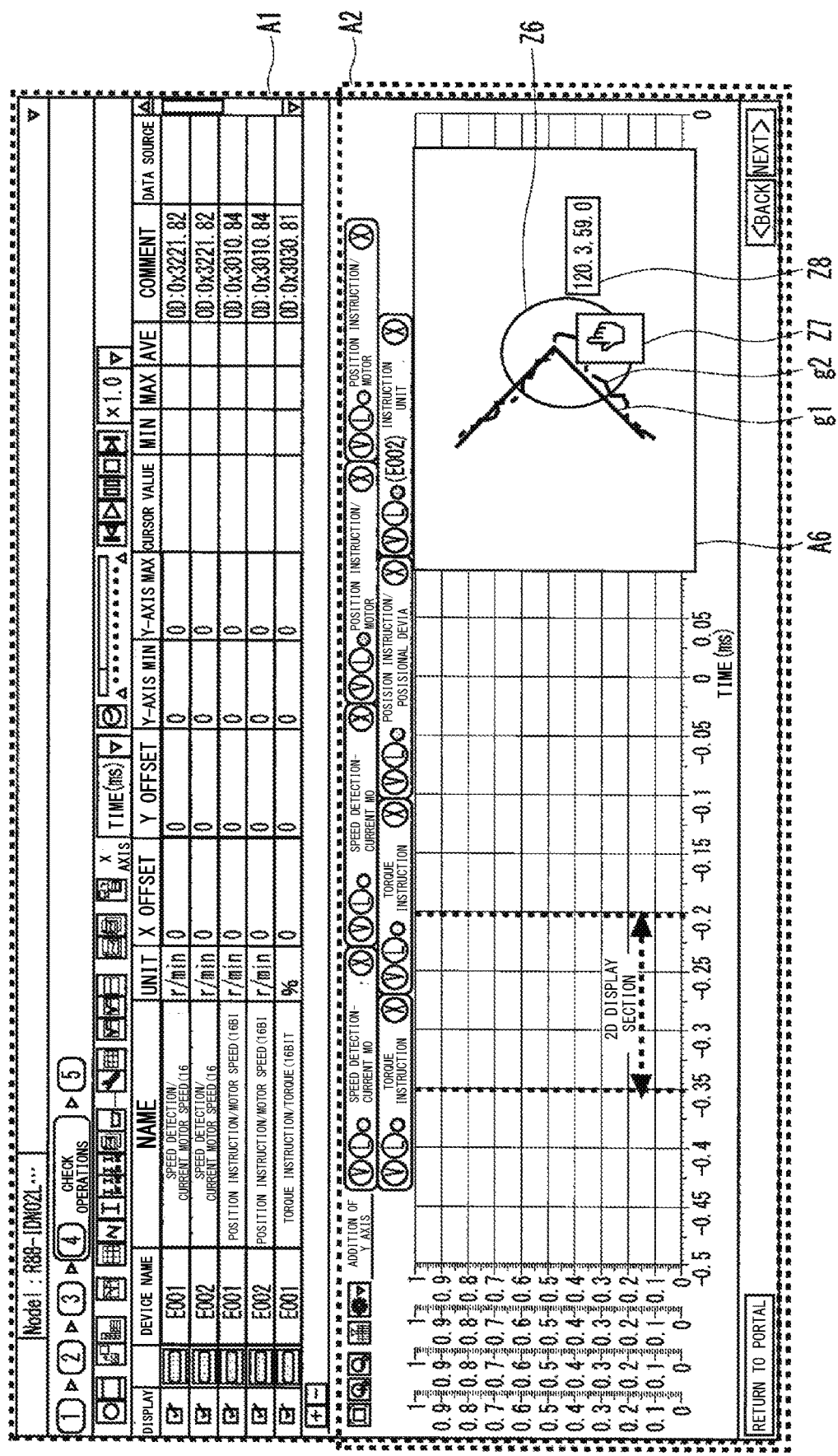
FIG. 7 is a diagram illustrating a user interface involved with reading of a data value.

FIG. 7 is a diagram illustrating the user interface in Case 6. The display area A1, the area A2 and the area A6 are the same as those in FIG. 5, and therefore, descriptions thereof will be omitted. The same holds true for the target trajectory g1, the control trajectory g2 and the marker Z6 displayed in the area A6.

In FIG. 7, it is assumed that a cursor or the like is placed over the control trajectory g2 displayed as a graph in the area A6 through a user operation. In response to detecting that the position of the displayed cursor or the like coincides with the position of the control trajectory g2 displayed as a graph, the adjustment apparatus 10 changes the mode of display of the cursor or the like placed over the trajectory into a GUI element Z7. The GUI element Z7 is previously stored in the auxiliary storage device 13 or the like.

In addition to updating the mode of display of the cursor or the like placed over the control trajectory g2, the adjustment apparatus 10 displays two-dimensional coordinates (x, y) on the control trajectory g2 corresponding to the position of the cursor or the like in a nearby area, which is close to the GUI element Z7. A display area Z8 for the two-dimensional coordinates (x, y) can be any area as far as the position on the control trajectory g2 displayed as a graph indicated by the GUI element Z7 can be visually recognized along with the displayed two-dimensional coordinate values. In the display area Z8 in FIG. 7, the two-dimensional coordinates (x, y) on the control trajectory g2 indicated by the GUI element Z7 are displayed as (120.3, 59.0), for example. The same holds true for the time-series information on each control axis displayed as a graph on the time base. The data value of the measurement information corresponding to the position on the graph displayed on the time base indicated by the GUI element Z7 and the time information are displayed in a nearby area.

With the adjustment apparatus 10, the data value displayed along with the cursor or the like whose mode of display has been changed can be identified as a data value of the displayed graph over which the cursor or the like is placed. However, whether to accept or cancel the change of the mode of display may be selected depending on the number of predetermined key operations (operations of a function key, for example). Whether to accept or cancel the change of the mode of display can be selected depending on whether the number of predetermined key operations is an even number or an odd number. The adjustment apparatus 10 can provide a user interface that is user-friendly for an operator who finds it inconvenient to change the mode of display of a cursor or the like.

(Case 7)

In FIG. 5, the adjustment apparatus 10 can also display a scale for measuring the error (positional deviation) between the target trajectory g1 and the control trajectory g2 in the two-dimensional plane displayed in the area A6. The width of the scale displayed in the area A6 can be increased or decreased within a range defined by preset upper and lower limit values according to the length of the period on the time base displayed in the area A6, for example. By displaying the scale, the adjustment apparatus 10 can provide a user interface that facilitates measurement of the error (positional deviation) between the target trajectory g1 and the control trajectory g2.

Figure 8:
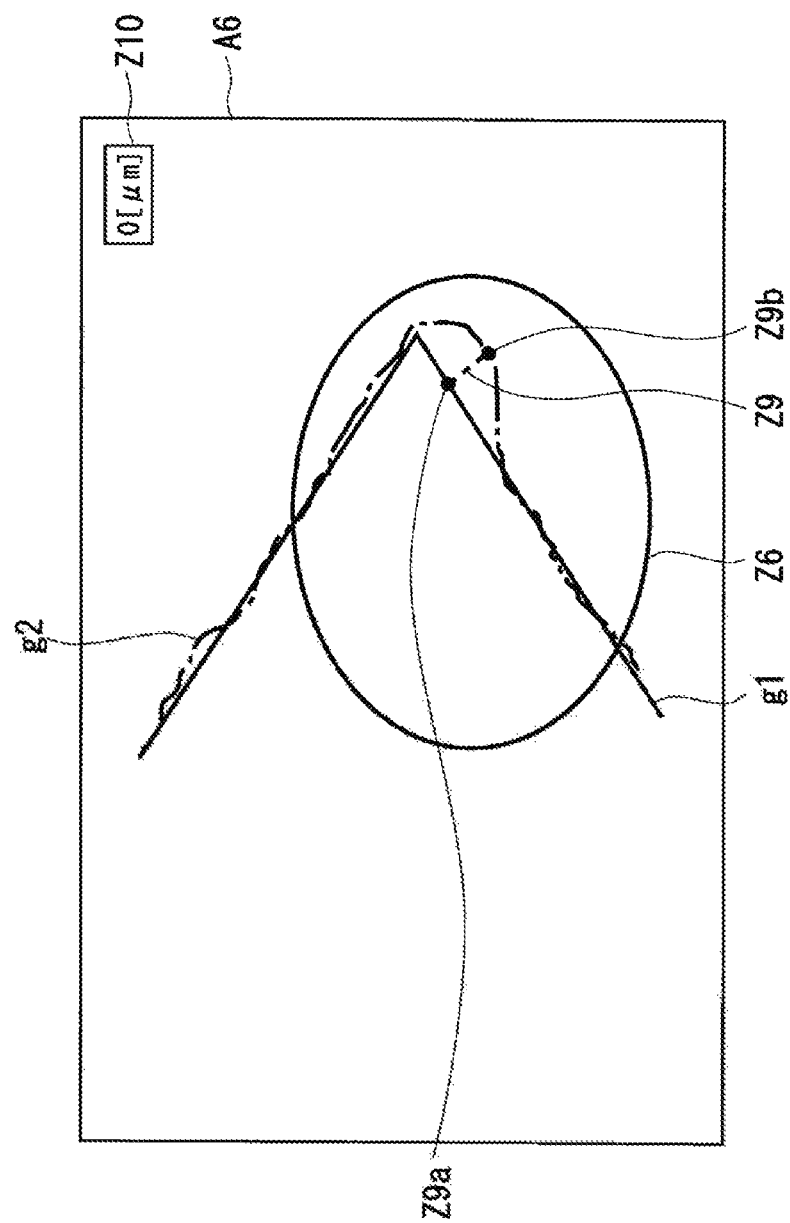
FIG. 8 is a diagram illustrating a user interface involved with error measurement.

The adjustment apparatus 10 can also provide a user interface for measuring the distance (error) between the target trajectory g1 and the control trajectory g2 displayed in the area A6. FIG. 8 is a diagram illustrating the user interface for error measurement. The area A6, the target trajectory g1, the control trajectory g2 and the marker Z6 illustrated in FIG. 8 are the same as those in FIG. 5, and therefore, descriptions thereof will be omitted.

For example, the adjustment apparatus 10 receives, as an operation for measuring the error, a click operation in a state where the cursor or the like is placed over the target trajectory g1 in the two-dimensional plane and a click operation in a state where the cursor or the like is placed over the control trajectory g2 immediately after the click operation. The click operation in a state where the cursor or the like is placed over the target trajectory g1 specifies a start position of the measurement of the error, and the click operation in a state where the cursor or the like is placed over the control trajectory g2 immediately after the former click operation specifies an end position of the measurement.

For example, in response to receiving the operation of specifying the start position of the measurement of the error, the adjustment apparatus 10 displays a single line connected to the start position at one end thereof, and extends the other end of the displayed single line to connect the other end of the extended single line to the end position indicated by the specifying operation immediately after the former specifying operation. As shown in FIG. 8, a start position Z9a indicated by the specifying operation for the target trajectory g1 and an end position Z9b indicated by the specifying operation for the control trajectory g2 are connected by a single line Z9 displayed.

For example, in response to receiving the operation of specifying the end position of the measurement of the error, the adjustment apparatus 10 displays the distance between the target trajectory g1 and the control trajectory g2 connected by the single line Z9 (distance between the start position Z9a and the end position Z9b) in the area A6 as an amount of an error. As shown in FIG. 8, the distance between the target trajectory g1 and the control trajectory g2 connected by the single line Z9 can be displayed in an area Z10 close to the upper right corner of the rectangular area A6, for example.

With the adjustment apparatus 10, the color of the single line Z9 and the color of the distance displayed in the area Z10 as an error can be a same type. The adjustment apparatus 10 can enhance the visibility of the measured error between the target trajectory g1 and the control trajectory g2 by displaying the single line Z9 and the distance in the area Z10 in the same color.

<3. Flow of Processes>

Figure 9:
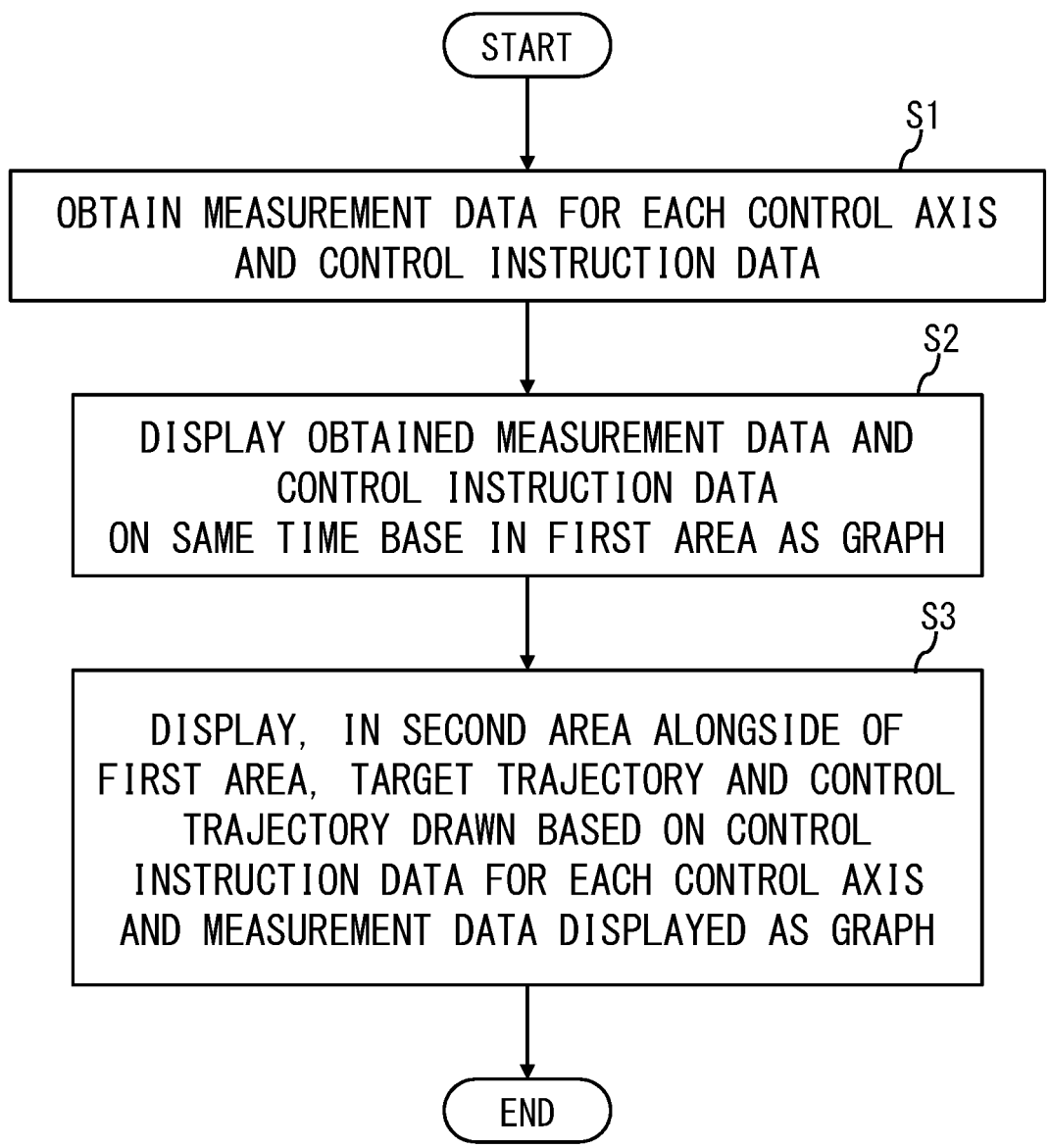
FIG. 9 is a flowchart illustrating an example of a user interface process according to the embodiment.

Next, with reference to FIGS. 9 and 10, user interface processes according to this embodiment will be described. FIG. 9 is a flowchart illustrating an example of a process of simultaneously displaying various trajectories linked with a time-series change or the like of measurement data for each control axis. The adjustment apparatus 10 according to this embodiment performs the user interface processes illustrated in FIGS. 9 and 10 by the CPU 11 or the like reading various programs or various kinds of data stored in the auxiliary storage device 13 and executing the programs, for example.

In the flowchart of FIG. 9, the process starts when the control axes are driven in association under the condition of the various parameters adjusted for each control axis and the condition of the various parameters adjusted for each control axis is evaluated, for example.

The adjustment apparatus 10 obtains measurement data for each servomotor 30 (control axis) being driven involved with the multi-axis cooperation control and a control instruction or the like from the corresponding servo driver 20 (S1). The adjustment apparatus 10 displays the measurement data for each servomotor 30 being driven and the control instruction or the like in a first area (area A2 in FIG. 3 and other drawings) of the adjustment screen in the form of a graph indicating a change of the speed or the like and a transition of a control target value on the same time base (S2).

In a predetermined display area of the adjustment screen, for example, time-series data indicating a speed or position change of each servomotor 30 forming a control axis of the control target 40 and a transition of a control target value are displayed as a graph color-coded on a control axis basis in a superimposed manner.

The adjustment apparatus 10 displays various trajectories drawn based on the measurement data for each control axis and the control instruction or the like in a second area (area A3 in FIG. 3 or area A6 in FIG. 5, for example) alongside of the first area in which the time-series change of the measurement data for each control axis and the transition of the control target value are displayed as a graph (S3). Display of the various trajectories has already been described above with regard to (Case 1) to (Case 4) and (Case 6).

For example, a transition, in a two-dimensional plane on the same time base, of a plurality of control axes associated with each other in the multi-axis cooperation control is displayed as a target trajectory and a control trajectory (actual trajectory) in the second area. A range on the time base may be specified for the measurement data for each control axis and the control instruction or the like linked with the control trajectory, for example. The range of the target trajectory and the control trajectory on the two-dimensional plane displayed in the second area may be automatically scaled based on the maximum value and minimum value for each control axis. Furthermore, when two-dimensional reference axes are displayed, whether to switch the axis directions of the two-dimensional reference axes may be chosen, for example. Furthermore, when a cursor or the like is placed over a graph displayed in the first or second area, the data value indicated by the cursor or the like may be displayed. The adjustment apparatus 10 ends the process illustrated in FIG. 9 after the processing S3.

Through the process described above, in an area where the time-series information on each control axis on the same time base is displayed as a graph, the adjustment apparatus 10 can display transitions of a plurality of associated control axes linked with the time-series information as a target trajectory and a control trajectory in parallel. The adjustment apparatus 10 can present transitions of a plurality of associated control axes at the same time. The user can evaluate the followability of the condition for the set parameters to the target trajectory or the mechanical characteristics (local vibrations) of the control target 40 in the multi-axis cooperation control from the visually recognized target trajectory and control trajectory. The adjustment apparatus 10 according to this embodiment can improve the usability for easily evaluating the result of adjustment of the plurality of axes operating in cooperation.

FIG. 10 is a flowchart illustrating an example of a process of marking a part of a control trajectory where the error (positional deviation) with respect to a target trajectory is relatively great. In the flowchart of FIG. 10, the process starts when various trajectories (target trajectory and control trajectory) drawn based on measurement data on each control axis and a control instruction or the like are displayed in the second area, for example. On the adjustment screen of the adjustment apparatus 10, the second area is displayed alongside of the first area in which a time-series change of measurement data on each control axis and a transition of a control target value are displayed as a graph.

The adjustment apparatus 10 obtains measurement data on each control axis and a control instruction or the like linked with the target trajectory and control trajectory displayed in the second area (S11). Based on the obtained measurement data on each control axis and control instruction or the like, the adjustment apparatus 10 calculates the error of the control trajectory with respect to the target trajectory (S12). The calculation of the error has already been described above with reference to FIG. 6. The calculated error is temporarily stored in a predetermined area in the main storage device 12 in association with the control trajectory.

According to a predetermined condition, the adjustment apparatus 10 marks a part of the control trajectory displayed in the second area in which the error (positional deviation) with respect to the target trajectory is relatively great (S13). Furthermore, the adjustment apparatus 10 marks a part of the graph for each control axis on the time base displayed in the first area corresponding to the marked part in the second area (S14). The marking in the first and second areas has already been described above with regard to (Case 5).

In the second area marked, the adjustment apparatus 10 may display a scale axis for visual recognition of the relative amount of the error between the control trajectory and the target trajectory. The adjustment apparatus 10 may display the error between the start position specified on the target trajectory and the end position specified on the control trajectory. The adjustment apparatus 10 ends the process illustrated in FIG. 10 after the processing of S14.

Through the process described above, the adjustment apparatus 10 can specify, with a marker or the like, a part of the control trajectory displayed in the second area in which the error (positional deviation) with respect to the target trajectory is relatively great. The user can easily identify the part specified by a marker or the like in which the error (positional deviation) of the control trajectory with respect to the target trajectory is relatively great.

Furthermore, the adjustment apparatus 10 can mark a part of the graph for each control axis on the time base displayed in the first area corresponding to the marked part in the second area. The user can check a data variation at the part specified by a marker or the like in the first area. The user can check an error variation on the control trajectory in association with the variation of the data on the time base displayed as a graph for each control axis. The adjustment apparatus 10 according to this embodiment can provide a user interface that facilitate evaluation of the appropriateness of the condition for the various parameters set and adjusted for each control axis.

The embodiment described above can be appropriately modified without departing from the spirit of the present disclosure. Although the input operation on the adjustment screen has been described as a click operation of a mouse or a keyboard operation in the above embodiment, the input operation may be a touch input operation on a touch panel or touch pad.

REFERENCE SIGNS LIST 1 servo control system
10 servomotor adjustment apparatus
11 CPU
12 main storage device
13 auxiliary storage device
14 input unit
15 output unit
16 communication IF
17 connection bus
20, 20 #1, 20 #2 servo driver
30, 30 #1, 30 #2 servomotor
40 control target
50 controller (PLC)

The invention claimed is:

1. A servomotor adjustment device, comprising:
first display means for displaying an adjustment screen for a servo parameter that is set for a motor driver that controls drive of a corresponding one of a plurality of control axes that make a control target operate in response to a control instruction;
means for setting a condition for the servo parameter adjusted on the adjustment screen in the motor driver for each control axis;
means for obtaining, along with the control instruction, measurement data on a speed control result or position control result for each of the control axes associated with each other under the condition for the servo parameter set in the motor driver for each control axis; and
second display means for displaying a graph indicating a temporal change of the measurement data for each control axis and the control instruction on a same time base in a first area in the adjustment screen, and displaying, in a second area in the adjustment screen, a control trajectory that indicates a transition of a control position of a control axis by association of the measurement data on the control axes measured at a same time and a target trajectory that indicates a transition of a target position of the control axis by association of the control instructions for the control axes obtained at a same time.

2. The servomotor adjustment device according to claim 1, wherein the second display means displays the first area and the second area at the same time by superimposing the second area on a part of the first area where the second area does not interfere with visibility of at least the graph indicating a temporal change of the measurement data for each control axis and the control instruction on the same time base in the first area.

3. The servomotor adjustment device according to claim 1, wherein the second display means calculates an error of the control trajectory with respect to the target trajectory and displays at least a part of the control trajectory displayed in the second area where the calculated error is relatively great in a discriminable manner.

4. The servomotor adjustment device according to claim 3, wherein the second display means displays a range on the time base of the measurement data for each control axis displayed in the first area in which the calculated error is relatively great in a discriminable manner.

5. The servomotor adjustment device according to claim 1, wherein the second display means displays a first manipulation element that specifies a transition period of the control trajectory and the target trajectory displayed in the second area by superimposing the first manipulation element on the time base displayed in the first area.

6. The servomotor adjustment device according to claim 1, wherein the second display means displays reference axes perpendicular to each other in the second area, and displays a second manipulation element for choosing whether to switch axis directions of the reference axes perpendicular to each other.

7. The servomotor adjustment device according to claim 1, wherein the second display means displays measurement data or a data value of the control instruction that corresponds to a position of a pointer displayed to be superimposed on the graph displayed in the first area.

8. The servomotor adjustment device according to claim 1, wherein the second display means displays a position data value that corresponds to a position of a pointer displayed superimposed on the control trajectory or target trajectory displayed in the second area.

9. The servomotor adjustment device according to claim 1, wherein the second display means displays one or more scale axes in the second area, and a unit scale on the scale axis increases or decreases in a predetermined range in response to the second area being expanded or shrunk.

10. The servomotor adjustment device according to claim 1, wherein the second display means displays an amount of a relative error between a first position specified on the control trajectory and a second position specified on the target trajectory displayed in the second area.

11. A servomotor adjustment method, wherein a servomotor adjustment device performs:
- a first display step of displaying an adjustment screen for a servo parameter that is set for a motor driver that controls drive of a corresponding one of a plurality of control axes that make a control target operate in response to a control instruction;
- a step of setting a condition for the servo parameter adjusted on the adjustment screen in the motor driver for each control axis;
- a step of obtaining, along with the control instruction, measurement data on a speed control result or position control result for each of the control axes associated with each other under the condition for the servo parameter set in the motor driver for each control axis; and
- a second display step of displaying a graph indicating a temporal change of the measurement data for each control axis and the control instruction on a same time base in a first area in the adjustment screen, and displaying, in a second area in the adjustment screen, a control trajectory that indicates a transition of a control position of a control axis by association of the measurement data on the control axes measured at a same time and a target trajectory that indicates a transition of a target position of the control axis by association of the control instructions for the control axes measured at a same time.

\* \* \* \* \*